United States Patent
LeDoux et al.

(10) Patent No.: US 9,636,998 B1
(45) Date of Patent: May 2, 2017

(54) TANK ENCLOSURE WITH FAN

(71) Applicant: Caterpillar Paving Products Inc., Brooklyn Park, MN (US)

(72) Inventors: Eric LeDoux, Albertville, MN (US); Rahul Jhavar, Plymouth, MN (US)

(73) Assignee: Caterpillar Paving Products Inc., Brookyln Park, MN (US)

( * ) Notice: Subject to any disclaimer, the term of this patent is extended or adjusted under 35 U.S.C. 154(b) by 0 days.

(21) Appl. No.: 14/926,867

(22) Filed: Oct. 29, 2015

(51) Int. Cl.
| | |
|---|---|
| *B60K 13/04* | (2006.01) |
| *F01N 3/00* | (2006.01) |
| *B60K 15/063* | (2006.01) |
| *F01N 3/20* | (2006.01) |
| *B60K 15/03* | (2006.01) |

(52) U.S. Cl.
CPC ............ *B60K 15/063* (2013.01); *B60K 13/04* (2013.01); *F01N 3/2066* (2013.01); *B60K 2015/03263* (2013.01); *B60Y 2200/41* (2013.01); *F01N 2610/1406* (2013.01); *F01N 2610/1466* (2013.01)

(58) Field of Classification Search
CPC ................. B60K 15/063; B60K 13/04; B60K 2015/03263; B60K 13/00; B60K 13/06; F01N 3/2066; F01N 2610/1406; F01N 2610/14; F01N 2610/1466
See application file for complete search history.

(56) References Cited

U.S. PATENT DOCUMENTS

| | | |
|---|---|---|
| 9,046,018 B2 | 6/2015 | Herzberg |
| 9,080,307 B2 | 7/2015 | Numa |
| 2010/0266458 A1 | 10/2010 | Takeshita et al. |
| 2010/0319321 A1 | 12/2010 | Kamiya et al. |
| 2012/0048631 A1* | 3/2012 | Shatters ................. B60K 11/00 180/68.1 |
| 2013/0014496 A1 | 1/2013 | Fogg |
| 2014/0227138 A1 | 8/2014 | Okamoto et al. |
| 2014/0360161 A1 | 12/2014 | Arani et al. |

FOREIGN PATENT DOCUMENTS

JP        2013181400 A        9/2013

* cited by examiner

*Primary Examiner* — Jacob Amick
(74) *Attorney, Agent, or Firm* — Miller, Matthias & Hull

(57) ABSTRACT

A tank mounted into an enclosure with insulated sides is assembled into an engine compartment of a construction machine. A fan is coupled to the enclosure to draw air through the enclosure to cool a fluid in the tank, such as diesel exhaust fluid. A discharge pipe is used to exhaust the air from the enclosure external to the engine compartment.

20 Claims, 5 Drawing Sheets

TANK ENCLOSURE WITH FAN

TECHNICAL FIELD

The present disclosure relates to construction machines and, more particularly, relates to construction machines with diesel exhaust fluid (DEF) storage tanks.

BACKGROUND

Diesel exhaust fluid (DEF) is used in selective catalytic reduction (SCR) technology to reduce nitrogen oxide emissions in diesel engines. As manufacturers move to reduce these emissions across their product lines, SCR technology is moving beyond over-the-road trucks into various construction machines, such as graders, pavers, compactors, dozers, and others. DEF is consumed as the diesel engine operates, generally at a rate of 2-3% of fuel use and requires that DEF be stored on the machine so that the SCR technology can operate continuously as the machine is run.

However, DEF is sensitive to high temperatures that can significantly shorten the storage life of the DEF. Construction machines using DEF often operate in hot conditions. In a compactor, for example, hot asphalt from the paving surface adds to heat in the engine compartment generated by the engine so that ideally, a DEF storage tank would be located away from the engine compartment in order to prolong the DEF shelf life. In addition, locating a DEF storage tank inside the engine compartment can require removing bulky engine covers when refilling the tank. However, in many construction machines there are no suitable locations for DEF tanks outside the engine compartment, due to other moving parts, potential exposure to physical damage, operator station access or sightlines, etc.

U.S. Pat. No. 9,036,018 (the '018 patent) discloses a DEF tank inside an insulated box. However, the '018 patent achieves heating and cooling of the DEF exclusively using a secondary line that is routed into the DEF tank. Fluid in the line heats or cools the fluid as needed.

SUMMARY OF THE DISCLOSURE

In an aspect of the disclosure, a tank assembly in a construction machine includes an enclosure mounted inside an engine compartment of the construction machine, the enclosure having insulated sides and an insulated bottom, the enclosure having an open top and a diesel exhaust fluid (DEF) tank at least partially disposed inside the enclosure, and placed so that an air passage is created between the tank and at least one of the insulated sides. The DEF tank includes a fill port and a drip pan proximate the fill port. The tank assembly also includes a fan sealably attached to the enclosure, the fan inducing movement of air through the air passage, the fan discharging the air to the environment via a discharge pipe coupled to an exhaust port of the fan. In another aspect of the disclosure, a machine for use in construction includes a chassis having an engine compartment, a pair of drums supporting the chassis, and an enclosure mounted in the engine compartment having insulated sides and an insulated bottom. The machine includes a diesel exhaust fluid (DEF) tank disposed inside the enclosure so that an air passage is created between an insulated side and the tank. The DEF tank includes a fill port. The enclosure also includes a fan having an inlet and an exhaust port, the inlet directly connected to the enclosure, the fan inducing airflow through the air passage. The tank assembly also includes a discharge pipe coupled to the exhaust port of the fan and a drip pan proximate the fill port.

In yet another aspect of the disclosure, a construction machine has a DEF tank in an enclosure with insulated sides. The DEF tank and enclosure are part of a tank assembly mounted in an engine compartment of the construction machine. The construction machine has an airflow path for cooling the DEF tank that includes an opening in the enclosure through which air is drawn, a fan that receives the air through an inlet and discharges the air through an exhaust port, and an air passage from the opening in the enclosure to the inlet of the fan. The air passage is formed by an outer wall of the DEF tank and an inner wall of the enclosure.

These and other aspects and features will be more readily understood when reading the following detailed description and taken in conjunction with the accompanying drawings.

DETAILED DESCRIPTION

Figure 1:
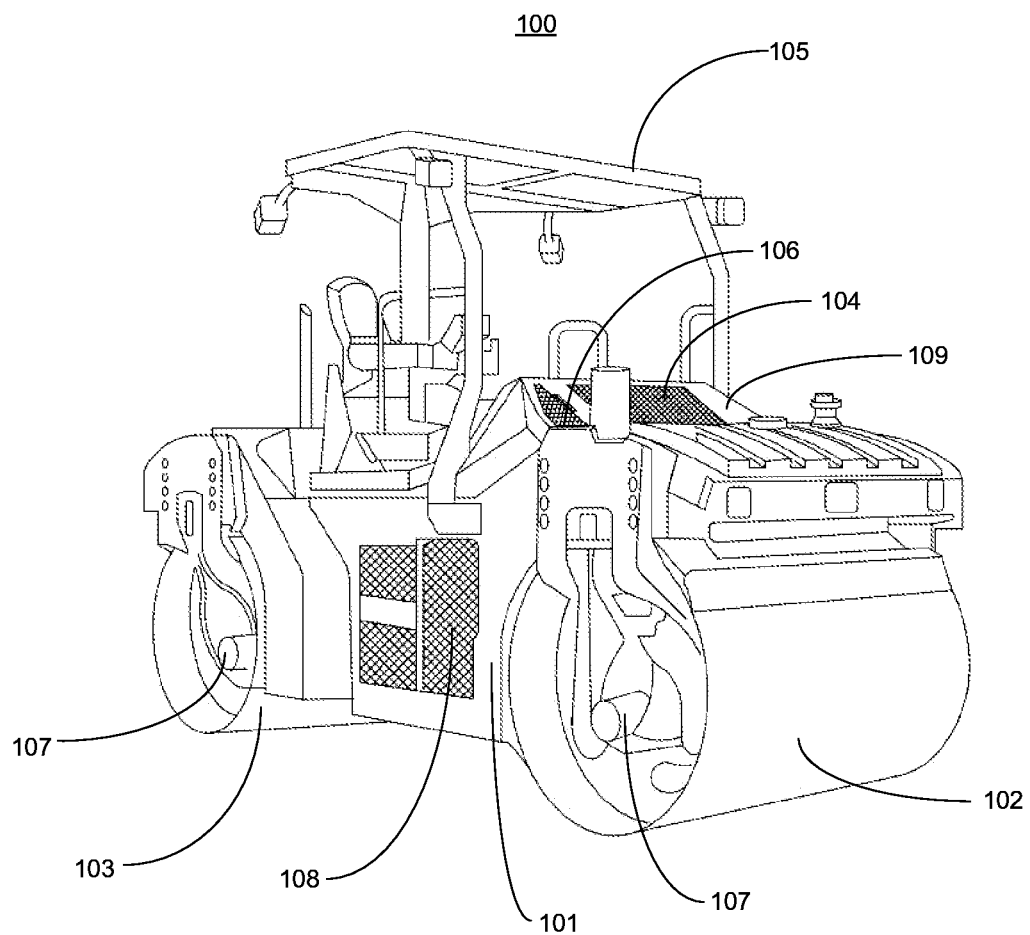
FIG. 1 is a perspective view of a construction machine in accordance with the current disclosure.

Referring now to the drawings, and with specific reference to FIG. 1, a construction machine 100, such as, but not limited to, a compactor, suitable for use in paving and related operations, is disclosed. The construction machine 100 includes a chassis 101 supported by a front drum 102 and a rear drum 103.

The chassis 101 supports an engine compartment 104 that houses, among other things, an engine and hydraulic pumps (not depicted). An operator station 105 is also supported by the chassis 101 and contains controls used to manage the operation of the construction machine 100. An access panel 106 in an engine cover 109 is provided to allow access to an interior of the engine compartment 104 and is discussed in more detail below. The front drum 102 and the rear drum 103 may each have a vibration unit 107 that, in some embodiments, rotates an off-center weight inside the drums 102, 103 to increase the compaction force beyond that of the weight of the construction machine 100. A vent 108 creates a fluid passage from inside the engine compartment 104 to ambient air. The vent 108 and associated equipment is also discussed more below. While the construction machine 100 illustrated is a compactor, the apparatus and method discussed below is applicable to any other type of machine or equipment used in the earth-moving, construction, mining, agriculture, transportation, and marine industries.

Figure 2:
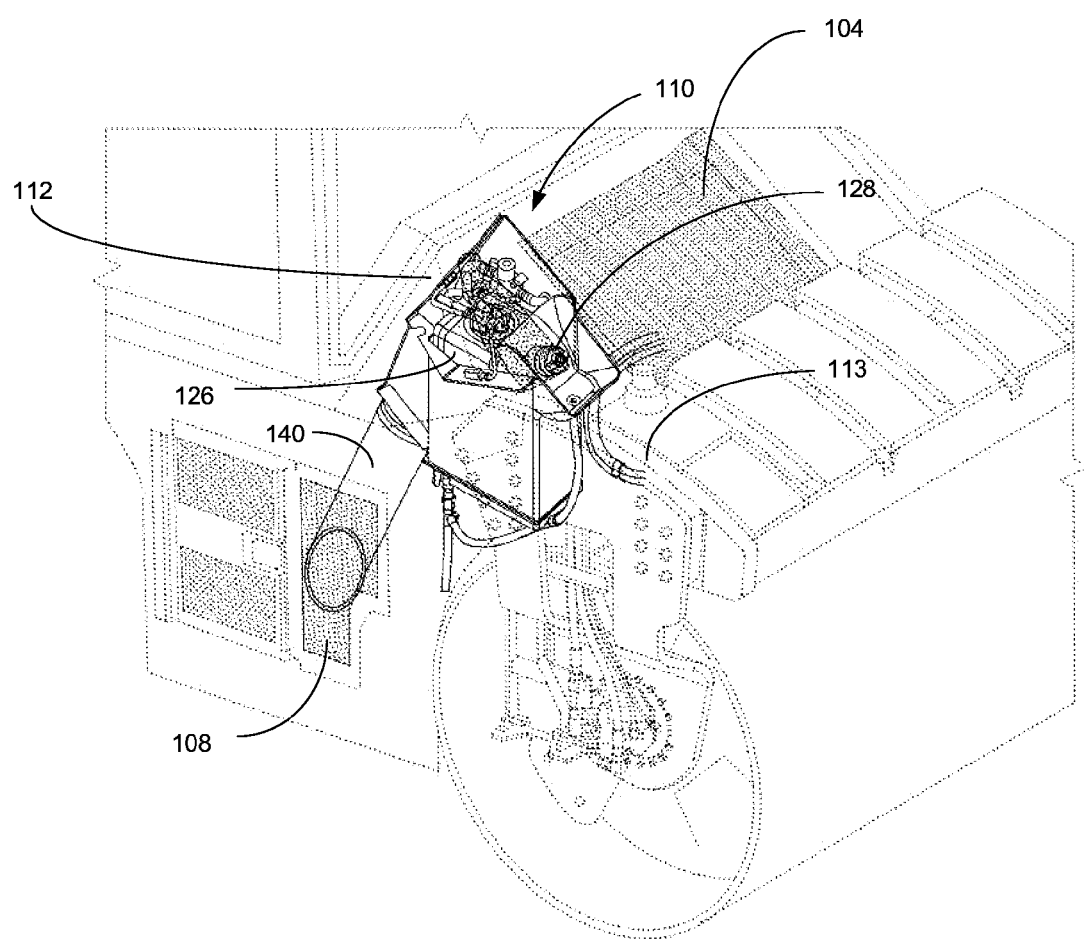
FIG. 2 is a perspective view of a tank assembly shown in the construction machine of FIG. 1.

FIG. 2 illustrates an exemplary embodiment in which a tank assembly 110 is mounted inside the engine compartment 104. The tank assembly 110 is discussed in more detail below but, in brief, protects DEF stored in the tank assembly 110 from engine and environmental heat by both insulating a tank 126 and by active cooling using a fan (not depicted in FIG. 2). The fan draws air past the tank 126 and exhausts the air via a discharge pipe 140 and out through the vent 108. The access panel 106 may be ventilated to allow air from above the engine compartment to enter the engine compartment 104, and more particularly to a top opening 162 of an enclosure 154 of the tank assembly, discussed more below. In an embodiment, the access panel 106 may be made from a perforated steel plate.

A fill port 128 is accessible via the access panel 106 (FIG. 1) that opens to allow the tank 126 to filled without removing the engine cover 109. The tank assembly 110 may be mounted against a first engine compartment wall 112 or a second engine compartment wall 113. In an embodiment, the tank assembly 110 may be mounting to either engine compartment wall 112, 113 using a shock absorbing mount similar to a rubber engine mount. In another embodiment, the tank assembly 110 may simply be bolted to a bracket on either engine compartment wall 112, 113 or to a bracket on an engine itself.

Figure 3:
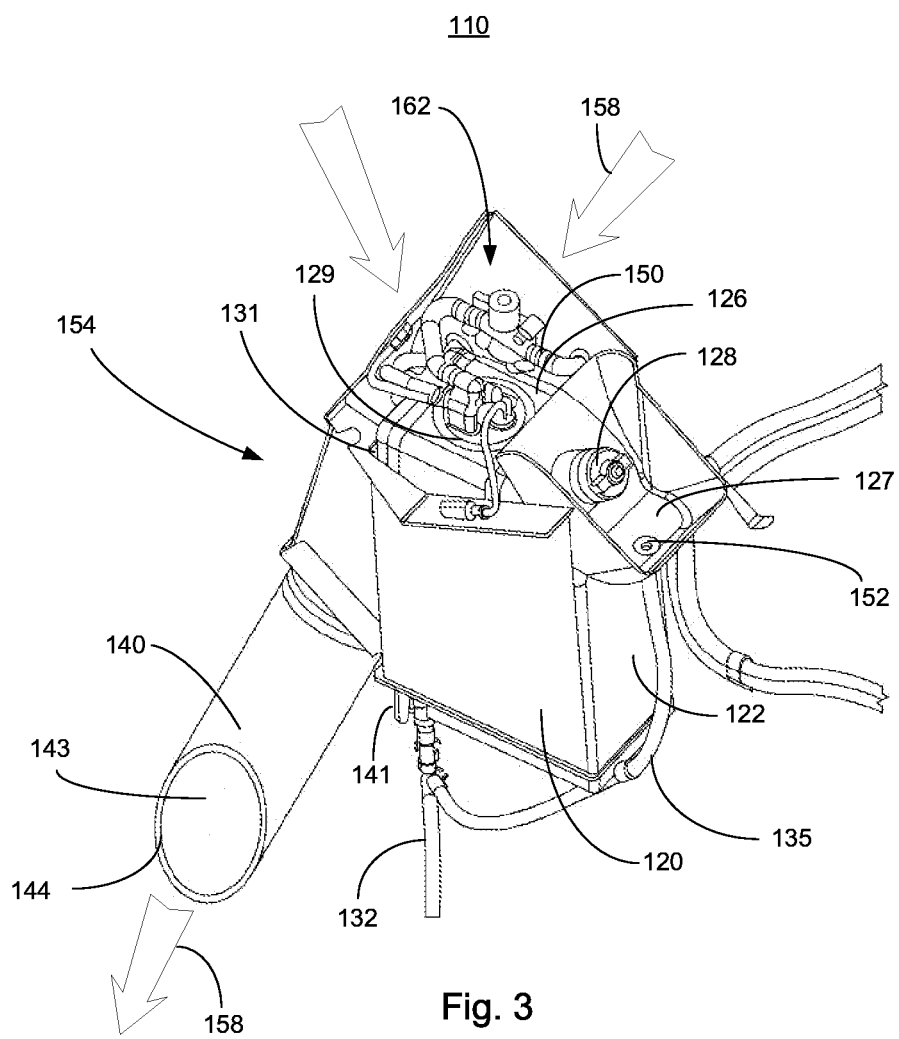
FIG. 3 is a perspective view of the tank assembly in accordance with the current disclosure.
Figure 4:
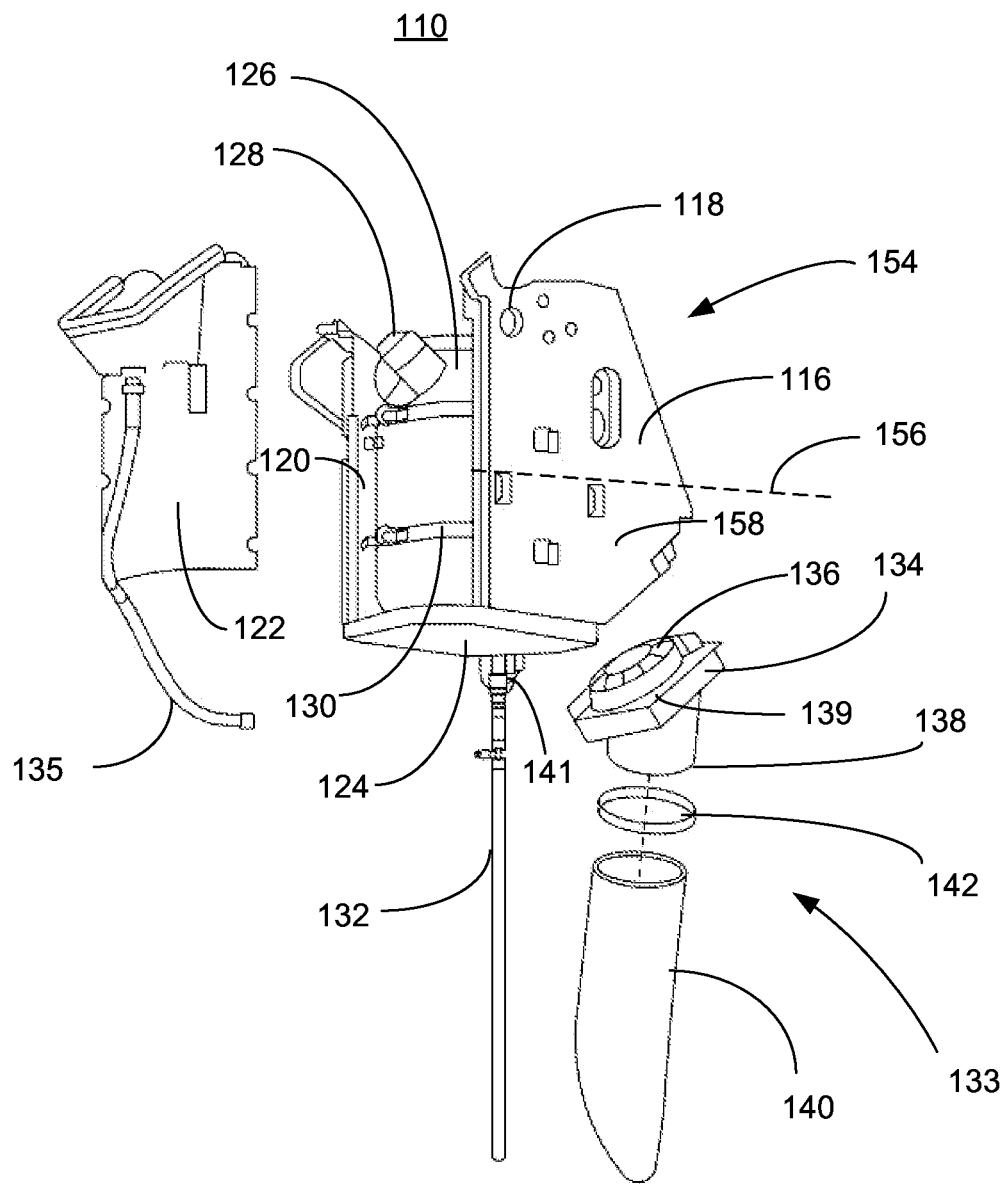
FIG. 4 is an exploded parts view of the tank assembly of FIG. 3.

The tank assembly 110 is shown in FIG. 3. The tank assembly 110 includes an enclosure 154 made from at least a first side 120 and a second side 122 and a tank 126. Additional sides and a bottom that make up the enclosure 154 are shown in FIG. 4. A fill port 128 allows fluid to be added to the tank 126. A drip pan 127 may be formed in one of the insulated sides 122 or may be incorporated as a separate element. A drain hole 152 allows fluid spilled during a fill operation to be carried via a pan drain line 134 to the drain line 132. A ball valve 141 may be used to drain the tank 126 via the drain hose 132.

A port 129 may be used to route fluid stored in the tank 126 to the engine. For example, when diesel exhaust fluid (DEF) is stored in the tank 126, the port 129 may be used to transmit DEF to an engine exhaust treatment system, such as a selective catalyst reduction system, via a supply line 150. The tank 126 is mounted in the enclosure 154 so that at least one side of the tank 126 is spaced apart from an opposing inside surface of a side, e.g., side 120, of the enclosure 154. This creates an air passage 131. A fan 134 (not depicted in FIG. 3) draws air through a top opening 162 of the enclosure 154 through the air passage 131 and out through a duct 143 in the discharge pipe 140. An outlet 144 of the discharge pipe 140 may be cut on an angle to match a profile of a vent 108 (FIG. 2) allowing air to be exhausted through the vent 108 to the environment, that is, the air immediately surrounding the construction machine 100. An airflow path 158 includes the top opening 162 in the enclosure 154 and the air passage 131 formed by an outer wall of the tank 126 and an inner wall of the enclosure as well as the fan 134. The airflow path 158 may also include the duct 143 of the discharge pipe 140.

An exploded view in FIG. 4 shows the tank assembly 110 in more detail. The enclosure 154 may be made from a first side 120, second side 122, a third side 116, and a bottom 124. In an embodiment, a fourth side (not depicted) may be included. In another embodiment, the enclosure 154 may have the three insulated sides 116, 120, 122 and bottom 124 while a final side of the enclosure 154 may be formed by one or both engine compartment walls 112, 113 or another other engine compartment mounting component (not depicted). In either embodiment, the insulated sides 116, 120, 122 and bottom 124 may be made of an insulated material or may be a base with an insulating material disposed over the base. In an embodiment, the tank 126 is spaced apart from each inside surface of the side walls of the tank 126, forming the air passage 131. The tank 126 may be coupled to one side 120 of the enclosure 154 using a mounting strap 130, so that there is direct contact between the side 120 and the tank 126. In this embodiment, the side 120 may be chosen to be closer to the engine compartment wall 113 of the engine compartment 104, rather than a side proximate the engine to reduce the amount of engine heat conducted through the side 120. Other mounting options are discussed below with respect to FIG. 5.

A fan assembly 133 may be coupled to the enclosure 154 so that an inlet 136 of a fan 134 draws air through the enclosure 154 and discharges the air through an exhaust port 138 of the fan 134. The fan assembly 133, and more particularly, the inlet 136 of the fan 134 may be coupled to the enclosure 154 with a seal 139 so that all the air flow through the fan 134 comes through the air passage 131 formed between the enclosure 154 and the tank 126. In other embodiments, the seal 139 may simple be a part of the inlet 136. In either embodiment, the fan 134 may be sealably attached to the enclosure 154 so that the fan 134 induces airflow exclusively through the air passage 131, through the fan 134, and into the discharge pipe 140. The discharge pipe 140 may be connected to the exhaust port 138 with the hose clamp 142 or a similar fastener.

In an alternate embodiment, the fan 134 may be mounted so that ambient air is drawn into the fan 134 and is discharged through the enclosure 154 and then returned to the environment. For example, if for space reasons the discharge pipe 140 were routed up past the operator station 105 instead of down toward the hot pavement, the air at the outlet 144 may be cooler than the air at the top opening 162. In that case, the fan direction may be reversed so that air is drawn into the fan 134 via the duct 143 and exhausted through the top opening 162. This is but one of many variations of fan placement in the airflow path 158.

In an embodiment, the fan 134 may be mounted below a midpoint designation 156 of the enclosure 154 so that the fan 134 is located at a lower half of the enclosure 154 to draw air past as much of the tank 126 as possible. In an embodiment where the top opening 162 of the enclosure is located at other than the top, the fan 134 may be placed opposite the opening. An aperture 118 may be provided for routing the supply line 150 out of the enclosure 154. Particularly if the aperture 118 faces away from an engine-facing side of the enclosure 154 and its associated heat, the aperture 118 may also be an entry point for air flow into the air passage 131.

Figure 5:
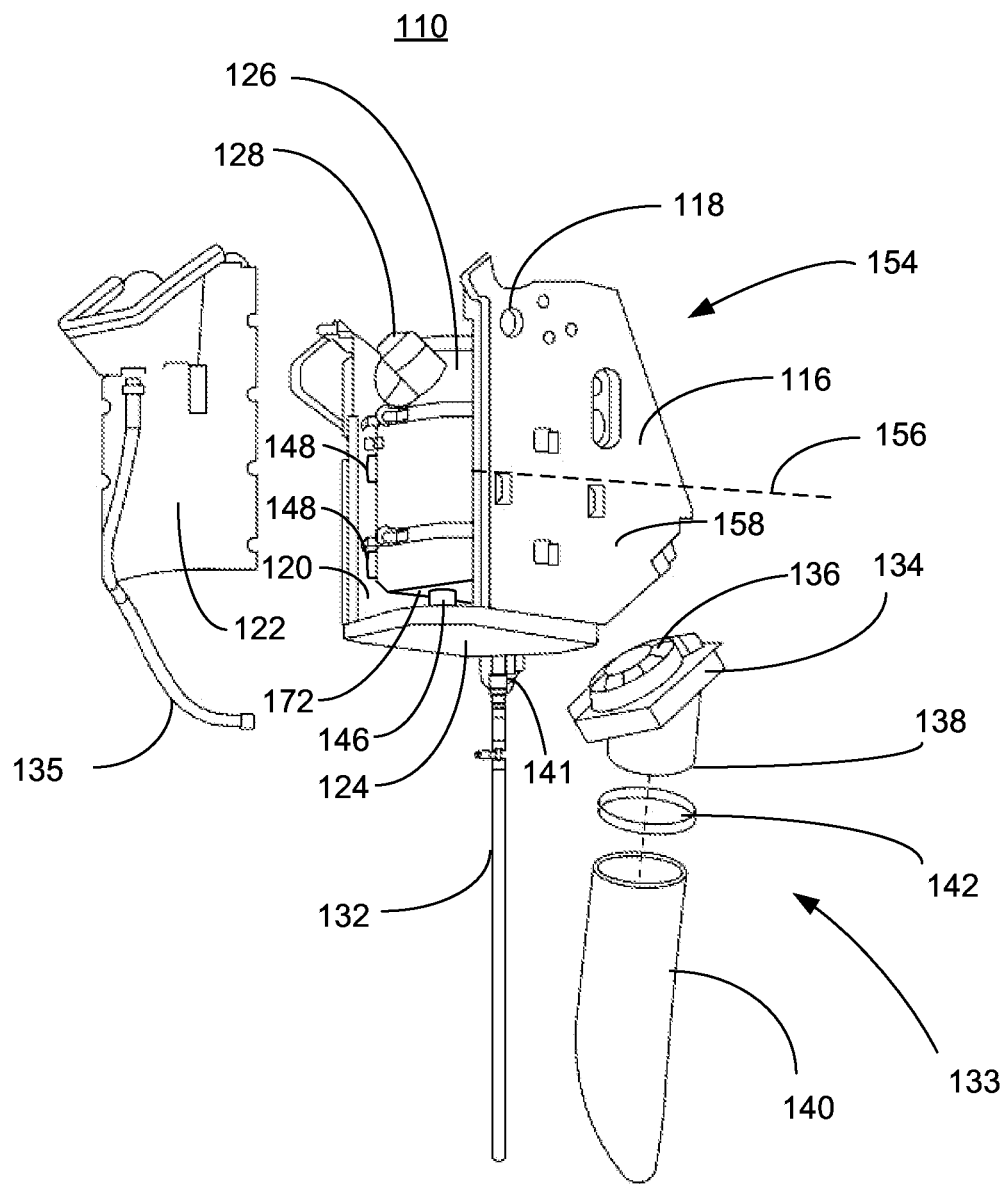
FIG. 5 is an exploded parts view of another embodiment of the tank assembly.

FIG. 5 is an exploded parts view of another embodiment of a tank assembly 170. Many of the components of the tank assembly 170 are similar to the components of the tank assembly 110 of FIG. 4, with an exception of added bottom standoff 146 and side standoffs 148. The standoffs 146, 148 extend the air passage 131 by creating additional space between the sides and bottom of the tank 126 and enclosure 154. The bottom standoff 146 may be one of several bottom standoffs that the support the tank 126 in order to create an additional portions of the air passage 131. Side standoffs 148 are placed between the tank 126 and the side 120 to further extend the air passage 131 to that side of the enclosure 154 to which the tank 126 is mounted. These additional elements of the air passage 131 provide for more surface area for air drawn into the enclosure 154 to provide cooling for the tank 126.

INDUSTRIAL APPLICABILITY

In general, the present disclosure finds applicability in many industries, including but not limited to earthmoving, construction, agriculture, transportation, forestry, and marine industries and may include machines including, but not limited to, highway trucks, off-highway trucks, excavators, tractors, dozers, motor graders, wheel loaders, scrapers, pavers, mining machines, feller bunchers, generators, and the like. More specifically, DEF is used to reduce emissions in diesel engines of such machines. However, the most common reagent in DEF is a urea chemical that is sensitive to high temperature. The shelf life of DEF is reduced as its temperature increases above 90 degrees Fahrenheit and reduces rapidly above 120 degrees F. The tank assembly 110 including the insulated sides 116, 120, 122, tank 126 and fan assembly 133 reduces the risk of overheating DEF due to exposure to engine heat and in the case of a compactor, the additional heat of hot paving material. The use of a tank assembly 110 is not limited to compactors, but can be applied to other construction machines or field equipment where mounting space external to the engine compartment is limited.

In an embodiment, the access panel 106 may be constructed of a material that allows external air to be drawn into the top opening 162. The air drawn through the enclosure 154 passes between the exterior of the tank 126 and the interior of the enclosure. The air may then be discharged via the discharge pipe 140 to the environment at block 212. In an embodiment, the air may be discharged through the vent 108 (FIG. 1).

In an embodiment, the air flows exclusively between an exterior of the tank 126 and an interior of the enclosure 154. That is, in such an embodiment the tank 126 itself has no tubes or penetrations that provide an alternate path for air flow surrounded by the tank 126.

The tank assembly 110 benefits owner/operators of a construction machine 100, such as a compactor, by, among other things, providing cooling when the lifetime of DEF or other temperature sensitive fluids can be threatened by high temperatures. Moreover, the placement and orientation of the tank assembly 110 allows easy access for refilling while providing the mechanical protection of being inside the engine compartment 104.

What is claimed is:

1. A tank assembly in a construction machine, the tank assembly comprising:
    an enclosure mounted inside an engine compartment of the construction machine, the enclosure having insulated sides and an insulated bottom, the enclosure having an open top;
    a diesel exhaust fluid (DEF) tank at least partially disposed inside the enclosure, and placed so that an air passage is created between the tank and at least one of the insulated sides, the DEF tank including a fill port;
    a drip pan proximate the fill port; and
    a fan sealably attached to the enclosure, the fan inducing movement of air through the air passage, the fan discharging the air to the environment via a discharge pipe coupled to an exhaust port of the fan.

2. The tank assembly of claim 1, further comprising a drain line attached to a bottom of the tank.

3. The tank assembly of claim 2, further comprising a ball valve attached to the drain line, the ball valve operable to drain a fluid from the tank.

4. The tank assembly of claim 2, further comprising a pan drain line coupled between the drip pan and the drain line.

5. The tank assembly of claim 4, wherein the enclosure includes an aperture configured for routing a supply line from the tank.

6. The tank assembly of claim 5, wherein an outlet of the discharge pipe is cut on an angle to match a profile of a vent in the construction machine.

7. A machine for use in construction, the machine comprising:
    a chassis having an engine compartment;
    a pair of drums supporting the chassis;
    an enclosure having insulated sides and an insulated bottom, the enclosure mounted in the engine compartment;
    a diesel exhaust fluid (DEF) tank disposed inside the enclosure so that an air passage is created between an insulated side and the DEF tank, the DEF tank including a fill port;
    a fan having an inlet and an exhaust port, the inlet directly connected to the enclosure, the fan inducing airflow through the air passage;
    a discharge pipe coupled to the exhaust port of the fan; and
    a drip pan proximate the fill port.

8. The machine of claim 7, further comprising a drain line attached to a bottom of the tank.

9. The machine of claim 8, further comprising:
    an engine cover protecting the engine compartment; and
    an access panel in the engine cover, the access panel moveably attached to the engine cover that opens to allow access to the fill port.

10. The machine of claim 9, wherein the access panel is ventilated to permit airflow through the access panel into the air passage.

11. The machine of claim 9, further comprising a ball valve coupled to the drain line, the ball valve operable to drain fluid from the DEF tank through the drain line.

12. The machine of claim 9, further comprising a pan drain line that couples the drip pan to the drain line attached to the bottom of the DEF tank.

13. The machine of claim 9, wherein the DEF tank is mounted above a front drum of the pair of drums.

14. The machine of claim 9, further comprising a supply line that transmits diesel exhaust fluid from the DEF tank to an exhaust treatment system.

15. An airflow path for cooling a DEF tank in an enclosure with insulated sides that is part of a tank assembly mounted in an engine compartment of a construction machine, the airflow path comprising:
    an opening in the enclosure through which air is drawn;
    a fan that receives the air through an inlet and discharges the air through an exhaust port; and
    an air passage from the opening in the enclosure to the inlet of the fan, the air passage formed by an outer wall of the DEF tank and an inner wall of the enclosure.

16. The airflow path of claim 15, further comprising a duct in a discharge pipe coupled to the exhaust port of the fan.

17. The airflow path of claim 16, further comprising a vent in the construction machine, the vent configured for airflow from the duct of the discharge pipe through the vent to the environment.

18. The airflow path of claim 17, further comprising an access panel in an engine cover of the construction machine, the access panel configured for airflow from the environment to the opening in the enclosure.

19. The airflow path of claim 18, further comprising a seal that attaches the fan to the enclosure so that airflow in the fan is exclusively through the air passage.

20. The airflow path of claim 19, further comprising a ventilated access cover mounted above the opening in the enclosure.

* * * * *